(No Model.)

F. ALBRECHT.
CONNECTING DEVICE FOR SECURING TUBES OR RODS TO MAINS, PLATES, &c.

No. 576,530. Patented Feb. 9, 1897.

Witnesses:

Inventor:
Friedrich Albrecht
By Edgar Tale & Co
Attorneys.

UNITED STATES PATENT OFFICE.

FRIEDRICH ALBRECHT, OF MELBOURNE, VICTORIA.

CONNECTING DEVICE FOR SECURING TUBES OR RODS TO MAINS, PLATES, &c.

SPECIFICATION forming part of Letters Patent No. 576,530, dated February 9, 1897.

Application filed June 11, 1896. Serial No. 595,145. (No model.)

*To all whom it may concern:*

Be it known that I, FRIEDRICH ALBRECHT, metal-spinner, a subject of the Emperor of Germany, and a resident of 441 Swanston Street, Melbourne, in the Colony of Victoria, have invented certain new and useful Improvements in Connecting Devices Specially Adapted for Securing Tubes or Rods to Mains, Plates, or other Articles, of which the following is a specification.

This invention is intended to enable connections to be rapidly, cheaply, strongly, and easily made, and is generally useful for securing tubes and rods to mains, plates, and other bases or articles in such manner that disconnection may also be easily effected, for example, for securing a branch pipe to a main, an upright to a floor, a bracket to a partition, a handle to a trunk, or a tap-stem or tube to a hollow vessel. In connecting a tube to a main or a tap-stem to a can it frequently happens that only the exterior of the main or can is accessible to the operator and that the walls of the main or can are thin and weak. My invention is particularly applicable in such cases, as will be apparent by referring to the accompanying drawings.

Figure 2:
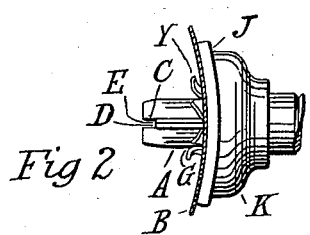
Figure 1:
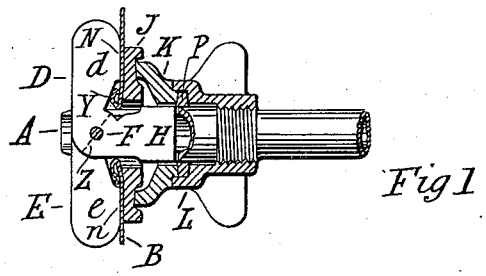
Figure 3:
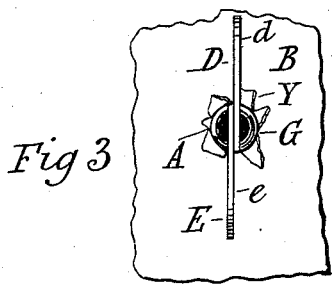
Figure 4:
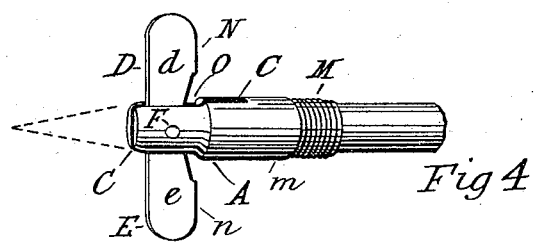
Figure 5:
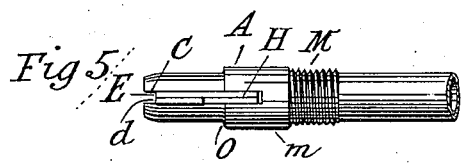
Figures 6, 7:
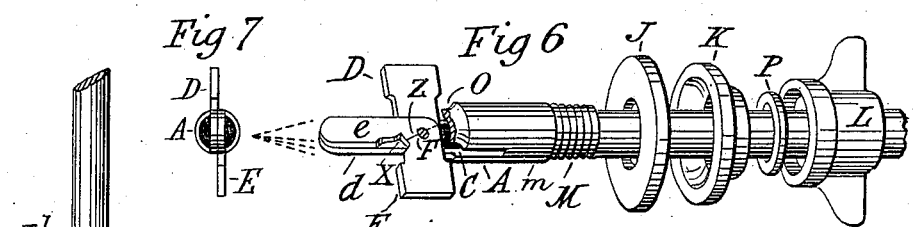
Figure 10:
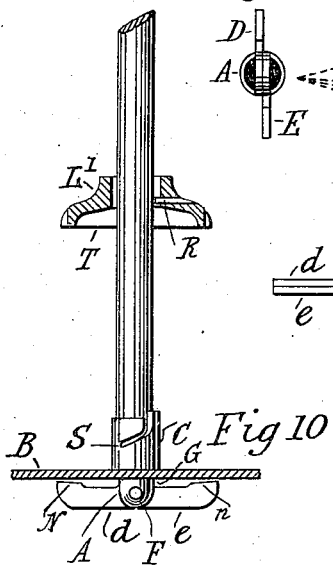
Figure 8:
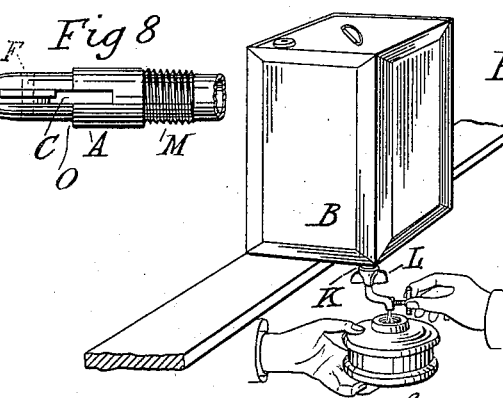
Figure 9:
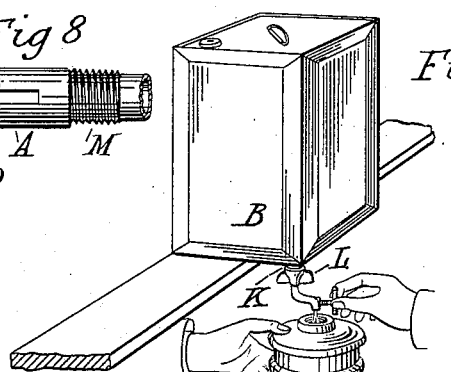

In the drawings, Figure 1 shows a side view, partly in vertical middle section, of a tap-stem connected to a base, as a can, main, or plate. Fig. 2 shows a plan view of part of a tube connected to a curved base. Fig. 3 is an end view of those parts in Figs. 1 and 2 which are located on the side of the base opposite to that from which the tube is inserted. Fig. 4 shows a side view, and Fig. 5 a plan view, of a rod having elbow-plates (hereinafter described) in the same position as in Fig. 1, other details of Fig. 1 being omitted. Fig. 6 shows in perspective the connecting devices in the position assumed on beginning to make the connection, an end part A, in which is formed a slot, being shown partly broken away to more clearly exhibit the elbow-plates, of which two are shown as the number generally preferable, although there may be only one or three, four, or more, if desired. Fig. 7 is an end elevation, and Fig. 8 a plan view, of details of Fig. 6. Fig. 9 is a perspective view illustrating my application of the invention for drawing off kerosene or other liquid from a thin metal can the interior of which is inaccessible to the operator. Fig. 10 shows an upright inserted into a base with the parts for forming the connection shown disconnected.

Various methods of connecting the elbow-plates with the end tube A are obviously available, the essential element in this connection being that these plates shall be pivotally connected to said end tube A, and a slot is shown in the drawings to illustrate the most generally useful manner of providing or making this connection.

The end A of the tube which is to be inserted in and secured to the can, main, plate, or other base B is slotted or given a saw-cut to form a recess within which are secured two elbow-plates D E, pivotally secured together, as by a rivet F, which passes through the tubing A and through the elbows of said plates. These plates are approximately L-shaped and are so adjusted side by side that one arm of each plate may lie entirely within the back part of the slot C at H, Figs. 1 and 5, while the other arms *d e* extend transversely outward from the saw-cut, one on each side of the latter, and with the edges N *n* (which are intended to press against the base B) in line with each other, as shown in Fig. 1. The arms *d e* may also be adjusted so as to extend along the end of the slot or outward from the tube or rod end in prolongation of the slot, as in Figs. 6 to 8, the other arms of the elbow-plates in that case extending transversely.

The hole G in the base B need not be circular, but may be roughly made in any convenient manner, a device for rendering unobjectionable the presence of torn or jagged edges Y (when there are any such) being indicated by the recess X, with which each elbow-plate is in such cases provided. The rough edges Y fall within the recesses X, allowing the smooth edges N *n* to contact with smooth parts of the base outside edges Y. The ends of the arms which in one position extend longitudinally outward from the slot C may, where conditions admit, be pointed to act (when in that position) as a hole cutter or borer, as indicated by dotted lines in Fig. 6. In tapping a kerosene-can the conditions would allow of this, as the metal is weak and ample interior space exists. A point often suitable, formed by the elongation of the end A on one side of the slot, is shown by dotted lines in Fig. 4. The arms *d e* need not be thin, as shown, and may be of any suitable cross-section.

Both sides of the end A may be brought forward to form a solid point, (*vide* Fig. 4,) the arms *d e* being made short enough and being pivoted near enough to the middle of the length of the slot to lie within the same when longitudinal therewith, the slot in that case being closed in at both ends by the substance of end A. It is when the two arms *d e* are together that those arms are inserted into the base B, the tube or rod end A being then pushed or forced inward. The transversely-extending arms then strike against the base, and the elbow-plates consequently swing on their pivot, the arms in the positions *d e*, Fig. 6, assuming the transverse positions *d e*, Fig. 1, while the arms which were transverse retire within the back of the slot C at H, Fig. 1. It will be clear that the arms *d e* are thus caused to locate themselves on the inside of the can, main, or other base, while the tube or rod end A may be a tight fit for the hole G. The plates D E must, however, be made sufficiently narrow at their elbows to allow them to swing on their pivot when being connected or disconnected without taking up too much space to pass through the hole in the base, the thickness of the latter being borne in mind. In the drawings the elbows are shown properly reduced, the diameter Z, Figs. 1 and 6, being somewhat less that the diameter of the hole G and the pivoting F being at the middle of line Z.

Where a washer or packing J is desirable to prevent leakage one of rubber, asbestos, soft or hard metal, or other suitable material may be used, closely fitting against the surface of the base B around the hole G. The washer J may be first placed outside the hole in the main and the end A then pressed in, or said washer may remain as in Fig. 6 until after end A has been inserted. The arms in the slot at H are then locked immovably within said slot and at the same time the base is tightly gripped, as seen in Fig. 1, between edges N *n* of the arms *d e* and any suitable clamp, as sleeve K. Sleeve K may be secured in place by a nut L, which engages a screw-thread M, provided upon the exterior of the tube or rod, preferably on a portion of the latter, which is of larger diameter than the part which enters hole G, there being thus provided a shoulder O, which prevents the tube or rod entering the base too far and protects the thread M from injury. The plain part between the slot and the thread is designated *m*. To prevent leakage, I employ a washer or packing P, which is suitably pressed home, as by nut L, the sleeve K being in such cases long enough to cover in the rear of slot C. The sleeve K and washers J P may be dispensed with when a fluid or gas tight joint is not required, nut L or the like causing the base to be tightly gripped, so that the tube or rod A will be rigidly fixed, the smooth part between M and O being also then unnecessary.

In Fig. 10 is shown a sleeve L', having an internally-projecting pin R, adapted to be advanced into slot S at the foot A of the upright until the base B becomes gripped between the contacting surfaces T of L' and N *n* of the arms *d e*, the other arms of the elbow-plates being within the slot C or in parallelism with the end A. This figure demonstrates the fact that the spirit of my invention may be preserved without adhering to the washers, sleeve, and nut illustrated in Figs. 1 and 6, what is essential being a clamp of any known kind which will grip the base between said clamp and the arm or arms of the elbow plate or plates on the other side of the base and will also hold the other arm or arms of the elbow plate or plates immovably.

When my device is to be disconnected, the exterior adjustable parts (as nut, sleeve, and washers) are separated from the base, as in Fig. 6, and the tube or rod A is then simply pulled out of the hole G, no turning of A being required and the device remaining in good order ready for making another connection.

After inserting the arms *d e* through base B they may be turned round into any position desired, according to circumstances, such as the direction desired to be assumed by the tap-nozzle; but if the tap-nozzle extends in the right direction when the insertion is made turning would be dispensed with. The latter observations apply to plane bases. Where the base is curved, as in Fig. 2, then by having arms *d e* in such a position during insertion that when they swing transversely they shall contact longitudinally along the base the said arms make contact practically as they would with a plane base. Sometimes the edges N *n* are made curved to correspond with a curved base, such as with the side of an oil-drum, when the latter is standing on end, gripping contact being then secured while the arms extend horizontally, that is, at right angles to their position in Fig. 2.

In Fig. 9 the parts are to be understood as arranged as in Fig. 1. It will be observed that owing to the fact that the whole of the slot C does not lie within the can B said slot greatly facilitates the discharge of the entire contents of the can, that is, when the connection is made to a bottom corner of the said can, the latter, furthermore, being so little damaged as to be repeatedly usable, (with a little patching if close sealing of the contents is required.) Thus this invention is calculated to result in enormous economies in those countries where large quantities of liquids in tins are consumed.

Having now particularly described and ascertained the nature of my said invention and in what manner the same is to be performed, I declare that what I claim is—

1. In a connecting device of the kind herein described, a tube or rod having a slot in the end thereof, in combination with elbow-plates, the elbows of which are pivoted within said slot, said tube being also provided with clamps which are adapted to clamp a base between the same, and one of the arms of said elbow-plates, substantially as shown and described.

2. In a connecting device of the kind herein described, a tube or rod as A, in which is formed a slot as C, said tube being provided with an annular shoulder as O, and a screw-threaded portion as M, and a plane portion as $m$, between the screw-threaded portion and the slot and elbow-plates, the elbows of which are pivoted in said slot, and a suitable clamp mounted on said tube, substantially as shown and described.

3. In a connecting device of the kind herein described, the combination with a tube provided with a slot in the end thereof, of elbow-plates, the elbows of which are pivoted in said slot, said plates being also provided with notches or recesses in the angles thereof, and clamping devices mounted on said tube and adapted to clamp a base as B, between the arms of said elbow-plates and said clamping devices, substantially as shown and described.

4. In a connecting device, a tube or rod end having one or more elbow-plates pivoted thereto, one arm of the or each, plate being adapted to pass through a base B, and swing on its pivot to bear against one side of the base, the remaining arm lying on the other side of said base, in combination with a clamp which locks the elbow plate or plates, immovably in relation to the tube or rod end and grips the base between said clamp and the elbow-plate arm or arms which bear against the base substantially and for the purposes set forth.

5. In a connecting device, a tube or rod end having an elbow-plate or elbow-plates pivoted thereto, said end and one arm of the, or each elbow-plate being adapted to enter a hole in a base, the other arm of the or each, elbow-plate extending transversely to the tube or rod end when the latter begins to enter the hole, but swinging to a longitudinal position on striking the base, whereby the or, each, arm within the hole is swung to bear against the base the or each, said elbow-plate having a recess X whereby jagged edges Y around said hole may be avoided, in combination with a leakage-preventing washer or washers and a clamp for immovably securing the washer or washers, elbow plate or plates, and the base together substantially as and for the purposes set forth.

6. In a connecting device, the combination of a slotted tube or rod end A, having one or more elbow-plates pivoted thereto, a shoulder O, a smooth portion $m$, and a screw-threaded portion M, with a sleeve K, nut L, and washers to prevent leakage, all substantially as and for the purposes set forth.

7. In a connecting device, a tube or rod end having one or more elbow-plates pivoted thereto, and a point for making a hole in a base, the, or each, plate having a recess adapted to avoid the jagged edges of said hole when the tube or rod end and part of the, or each, elbow-plate is inserted therein, in combination with a clamp for rigidly holding the tube or rod end, the base, and the, or each, elbow-plate rigidly together substantially as and for the purposes set forth.

In witness whereof I have hereunto set my hand, in the presence of two subscribing witnesses, this 25th day of April, 1896.

FRIEDRICH ALBRECHT.

Witnesses:
G. G. TURRI,
B. M. LOWE.